(12) United States Patent
Iida et al.

(10) Patent No.: US 11,385,127 B2
(45) Date of Patent: Jul. 12, 2022

(54) OPTICAL FREQUENCY MULTIPLEXING COHERENT OTDR, TESTING METHOD, SIGNAL PROCESSING DEVICE, AND PROGRAM

(71) Applicant: NIPPON TELEGRAPH AND TELEPHONE CORPORATION, Tokyo (JP)

(72) Inventors: Hiroyuki Iida, Musashino (JP); Tetsuya Manabe, Musashino (JP); Yusuke Koshikiya, Musashino (JP); Hidenobu Hirota, Musashino (JP); Takui Uematsu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/252,311

(22) PCT Filed: Jun. 12, 2019

(86) PCT No.: PCT/JP2019/023289
§ 371 (c)(1),
(2) Date: Dec. 15, 2020

(87) PCT Pub. No.: WO2019/244746
PCT Pub. Date: Dec. 26, 2019

(65) Prior Publication Data
US 2021/0262892 A1 Aug. 26, 2021

(30) Foreign Application Priority Data
Jun. 20, 2018 (JP) .............................. JP2018-117419

(51) Int. Cl.
*G01M 11/00* (2006.01)
*H04B 10/071* (2013.01)

(52) U.S. Cl.
CPC .... *G01M 11/3109* (2013.01); *G01M 11/3127* (2013.01); *G01M 11/3145* (2013.01); *H04B 10/071* (2013.01)

(58) Field of Classification Search
CPC . H04B 10/071; G01M 11/31; G01M 11/3109; G01M 11/3118; G01M 11/3127;
(Continued)

(56) References Cited

U.S. PATENT DOCUMENTS

2020/0036440 A1* 1/2020 Yamagishi ............. H04B 10/40
2020/0411031 A1* 12/2020 Ito ........................ G10L 21/0264

FOREIGN PATENT DOCUMENTS

| CN | 102645268 A | * | 8/2012 |
|---|---|---|---|
| JP | 2011164075 A | | 8/2011 |
| JP | 2017032466 A | * | 2/2017 |

* cited by examiner

*Primary Examiner* — Gordon J Stock, Jr.

(57) ABSTRACT

An object of the present disclosure is to provide a frequency division multiplexing coherent OTDR, a test method, a signal processing apparatus, and a program that can maintain, even in a case where a DFB laser is used, a spatial resolution equivalent to a spatial resolution achieved when a fiber laser or an external resonant laser is used. An OTDR according to the present disclosure includes a light incidence unit configured to change an optical frequency of light from a light source by a predetermined frequency interval at a predetermined time interval to generate test light pulses and cause the test light pulses to sequentially enter a fiber under test, a light reception unit configured to use the light from the light source as local light to coherently detect backscattered light from the fiber under test to acquire a received signal, and a computation unit configured to separate the received signal into signals with frequencies obtained by changing the optical frequency by the predetermined frequency interval, square amplitudes of the signals resulting from fre- (Continued)

quency separation to generate square values, perform Wiener filter processing on the square values, compensate values resulting from the Wiener filter processing for delay time when the test light pulses are caused to enter the fiber under test, and calculate an arithmetic mean of the compensated values.

7 Claims, 3 Drawing Sheets

(58) Field of Classification Search
CPC ......... G01M 11/3136; G01M 11/3145; G01M 11/3154; G01M 11/3163; G01M 11/3172; G01M 11/3181; G01M 11/319
See application file for complete search history.

OPTICAL FREQUENCY MULTIPLEXING COHERENT OTDR, TESTING METHOD, SIGNAL PROCESSING DEVICE, AND PROGRAM

CROSS-REFERENCE TO RELATED APPLICATIONS

This application is a 371 U.S. National Phase of International Application No. PCT/JP2019/023289, filed on Jun. 12, 2019, which claims priority to Japanese Application No. 2018-117419 filed on Jun. 20, 2018.

TECHNICAL FIELD

The present disclosure relates to an optical pulse test method for measuring a light loss distribution, breaking positions, and the like for an optical line.

BACKGROUND ART

Optical Time Domain Reflectometry (hereinafter, referred to as OTDR) is a known technique for measuring a distance, a light loss distribution, breaking positions, and the like for a fiber under test (hereinafter, referred to as FUT). The OTDR is an apparatus or a method that measures a reflectance distribution of light (hereinafter referred to as an OTDR waveform) at different points on the FUT by transmitting test optical pulses through the FUT and measuring the power, in a time domain, of reflected light or Rayleigh backscattered light (hereinafter, simply referred to as backscattered light) generated in the FUT by the test optical pulses.

PTL1 discloses frequency division multiplexing coherent OTDR (hereinafter referred to as FDM-OTDR) as an OTDR for submarine optical cable testing. The FDM-OTDR has the feature of being capable of achieving a plurality of measurements at a time by causing incidence, on the FUT, of a test light pulse train including a plurality of light pulses arranged along a time axis and having different optical frequencies, and executing processing of receiving, at a time, backscattered light for the plurality of light pulses generated in the FUT.

The FDM-OTDR described in PTL1 will be briefly described below. FIG. 4 is a diagram illustrating a configuration of the FDM-OTDR described in PTL1. The FDM-OTDR uses a branching element 12 to branch output light from a light source 11 into two rays, and uses, as local light, one of the rays resulting from the branching, while using the other as test light. An optical frequency controller 13 in the FDM-OTDR changes the optical frequency of the test light by a predetermined frequency interval at predetermined time intervals to convert the test light into light pulses and causes the light pulses to repeatedly enter a fiber under test 18 (see FIG. 5). Then, the FDM-OTDR uses a coupling element 19 to couple the local light to backscattered light generated at different points on the fiber under test 18 by reflection or scattering, receives and converts the coupled light into a current, and separates the current into different frequencies, and a computation processing apparatus 25 determines a reflectance distribution of reflected light and backscattered light from the fiber under test 18 generated by a plurality of frequency components of the test light.

Here, the method in which the optical frequency controller 13 and the computation processing apparatus 25 are used to separate the output light from the light source 11 into different frequencies needs to satisfy the following conditions.

(Condition 1) The line width of the output light from the light source 11 is smaller than the reciprocal of the time for which the optical frequency controller 13 sustains a predetermined frequency.

(Condition 2) A frequency shift interval used by the optical frequency controller 13 is a natural number multiple of the reciprocal of the predetermined time interval for which the frequency is sustained.

(Condition 3) The total amount of predetermined frequency shift used by the optical frequency controller 13 is ½ or less of a sampling rate of a digitization processor 24.

(Condition 4) The natural number multiple of frequency resolution of Fourier transform based on computation processing is the frequency shift interval used by the optical frequency controller 13.

Typically, a light pulse testing machine can acquire only one OTDR waveform per measurement (a normal light pulse testing machine) but can simultaneously acquire Y OTDR waveforms by changing Y frequencies of the test light by a predetermined frequency interval at predetermined time intervals for frequency separation and measurements to satisfy the above-described conditions. By calculating the arithmetic mean of these waveforms, the number of additions per measurement can be increased by a factor of Y. Thus, the FDM-OTDR can improve SWDR by $5 \log \sqrt{Y}$ (dB) during the same measurement time as that of the normal light pulse testing machine (see FIG. 6). This also means that the FDM-OTDR can shorten the measuring time by 1/Y in obtaining the same dynamic range as that achieved by the normal light pulse testing machine.

CITATION LIST

Patent Literature

PTL1: JP 2011-164075 A

SUMMARY OF THE INVENTION

Technical Problem

However, in the FDM-OTDR described in PTL1, in a case where the spectral line width of a laser light source generating test light pulses is not sufficiently smaller than a signal band corresponding to the reciprocal of the test light pulse width, there is a problem in that a large dead zone results, preventing accurate obtainment of a correct distribution of fiber losses and waveforms indicating reflection events at failure points.

Generally, in a case where the condition that the line width of the laser light source is sufficiently smaller than the band of the test light pulse is not satisfied, side lobes of a backscattered light signal spectrum at respective optical frequencies are high, increasing the number of overlapping spectrum components of test light pulses having different frequencies. This precludes frequency separation even with the use of a frequency response filter having sufficient performance. With insufficient frequency separation, the FDM-OTDR, in which test light pulses having different frequencies are arranged along the time axis for the above-described reasons, exhibits the tendency that test pulse light rays incident at different points in time cause waveforms obtained by measurements to be temporally spread. This leads to a large dead zone at a point where a rapid fluctuation in reflectance such as reflection or a gain of a relay occurs.

For the reasons described above, the FDM-OTDR needs to use a laser light source for generation of test light pulses having a sufficiently smaller spectral line width than the signal band corresponding to the reciprocal of the test light pulse width. For example, at a spatial resolution of 1 km required for OTDR waveforms in submarine optical cable measurements, the test pulse width is 10 µs, and the signal band is 100 kHz. Accordingly, at a spatial resolution of 1 km, a laser light source needs to be used that has a line width of 10 kHz or less, which is sufficiently smaller than a signal band of 100 kHz.

However, typically, a distributed feedback (referred to hereinafter as "DFB") laser used in optical communications has a line width of approximately 100 kHz, which does not satisfy optical performance corresponding to a line width of 10 kHz or less.

In general, the line width of the laser is dependent on the resonator length of the laser, and thus an optical property corresponding to a line width of 10 kHz or less is satisfied by a laser enabled to have a large resonator length, for example, a fiber laser or an external resonant laser. Such a laser includes a large number of components, and is generally more expensive than DFB lasers.

As described above, the FDM-OTDR poses a problem in that an expensive fiber laser or an external resonant laser needs to be used as a light source for generating test light pulses in order to increase the spatial resolution to measure the correct fiber loss distribution and waveforms indicating reflection events at failure points, making a reduction in apparatus price difficult.

Thus, in order to solve the problems described above, an object of the present disclosure is to provide a frequency division multiplexing coherent OTDR, a test method, a signal processing apparatus, and a program that can maintain, even in a case where a DFB laser is used, a spatial resolution equivalent to a spatial resolution achieved when a fiber laser or an external resonant laser is used.

Means for Solving the Problem

In order to achieve the object described above, FDM-OTDR according to the present disclosure executes Wiener filter processing on a signal subjected to Fourier transform in computation processing for determining the reflectance distribution of backscattered light from a fiber under test.

Specifically, a frequency division multiplexing coherent OTDR according to the present disclosure includes a light incidence unit configured to change an optical frequency of light from a light source by a predetermined frequency interval at a predetermined time interval to generate test light pulses and cause the test light pulses to sequentially enter a fiber under test, a light reception unit configured to use the light from the light source as local light to coherently detect backscattered light from the fiber under test to acquire a received signal, and a computation unit configured to separate the received signal into signals with frequencies obtained by changing the optical frequency by the predetermined frequency interval, square amplitudes of the signals resulting from frequency separation to generate square values, perform Wiener filter processing on the square values, compensate values resulting from the Wiener filter processing for delay time when the test light pulses are caused to enter the fiber under test, and calculate an arithmetic mean of the compensated values.

A test method according to the present disclosure includes changing an optical frequency of light from a light source by a predetermined frequency interval at a predetermined time interval to generate test light pulses and causing the test light pulses to sequentially enter a fiber under test, using the light from the light source as local light to coherently detect backscattered light from the fiber under test to acquire a received signal, and separating the received signal into signals with frequencies obtained by changing the optical frequency by the predetermined frequency interval, squaring amplitudes of the signals resulting from frequency separation to generate square values, performing Wiener filter processing on the square values, compensating values resulting from the Wiener filter processing for delay time when the test light pulses are caused to enter the fiber under test, and calculating an arithmetic mean of the compensated values.

Furthermore, a signal processing apparatus according to the present disclosure is a signal processing apparatus for a frequency division multiplexing coherent OTDR including a light incidence unit configured to change an optical frequency of light from a light source by a predetermined frequency interval at a predetermined time interval to generate test light pulses and cause the test light pulses to sequentially enter a fiber under test, and a light reception unit configured to use the light from the light source as local light to coherently detect backscattered light from the fiber under test to acquire a received signal, wherein the signal processing apparatus includes separating the received signal into signals with frequencies obtained by changing the optical frequency by the predetermined frequency interval, squaring amplitudes of the signals resulting from frequency separation to generate square values, performing Wiener filter processing on the square values, compensating values resulting from the Wiener filter processing for delay time when the test light pulses are caused to enter the fiber under test, and calculating an arithmetic mean of the compensated values.

The use of a winner filter allows compensation for the effect of the spectral line width of the laser light source included in the received signal corresponding to received return light from the FUT. Thus, even in a case where an inexpensive DFB laser is used as a light source, spreading of a dead zone can be reduced. Accordingly, the present disclosure can provide a frequency division multiplexing coherent OTDR, a test method, and a signal processing apparatus that can maintain, even in a case where DFB laser is used, a spatial resolution equivalent to a spatial resolution achieved when a fiber laser or an external resonant laser is used.

Here, the Wiener filter processing is preferably processing of performing inverse Fourier transform on a value obtained by multiplying a square value of the square values resulting from Fourier transform by a value obtained by dividing a complex conjugate of a frequency spectrum of the light source resulting from Fourier transform by a value obtained by adding any value to the second power of the frequency spectrum of the light source resulting from Fourier transform.

Additionally, the light incidence unit preferably superimposes, on each of the test light pulses, dummy light having a wavelength different from a wavelength of the light from the light source. By superimposing the dummy light on each of the test light pulses to suppress a fluctuation in intensity of the entire test light, the intensity of the dummy light can be adjusted to substantially the same level as that of a signal light intensity for communication, and the effect of optical surge can be suppressed.

A program according to the present disclosure is a program causing a computer to operate as the signal processing apparatus. The signal processing apparatus can also be implemented by the computer and the program, and the program can also be recorded in a recording medium or provided through a network.

Effects of the Invention

The present disclosure can provide a frequency division multiplexing coherent OTDR, a test method, a signal processing apparatus, and a program that can maintain, even in a case where a DFB laser is used, a spatial resolution equivalent to a spatial resolution achieved when a fiber laser or an external resonant laser is used.

DESCRIPTION OF EMBODIMENTS

Hereinafter, embodiments of the present disclosure will be described with reference to the drawings. The embodiment described below is an example of the present disclosure, and the present disclosure is not limited to the following embodiment. In this specification and the drawings, constituent elements having the same reference signs are assumed to be the same.

Figure 1:
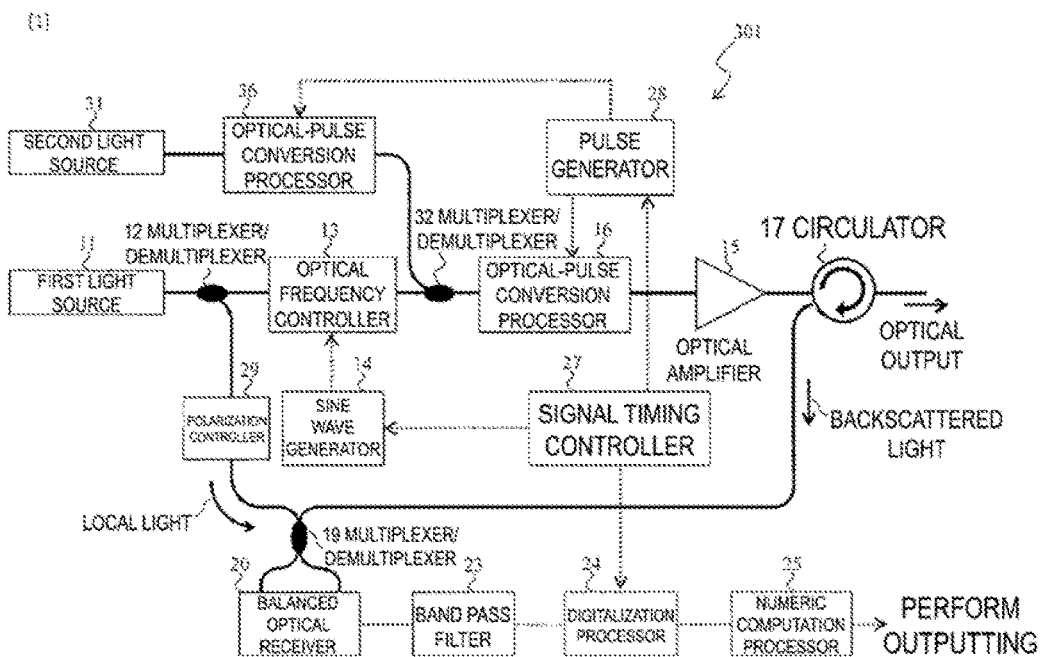
FIG. 1 is a diagram illustrating a configuration of a frequency division multiplexing coherent OTDR according to the present disclosure.

FIG. 1 is a diagram illustrating a configuration of a frequency division multiplexing coherent OTDR 301 (hereinafter sometimes referred to as an optical pulse test apparatus 301) according to the present embodiment. The optical pulse test apparatus 301 can determine reflectance distributions of reflected light and backscattered light from an FUT generated by frequency components of test light.

The optical pulse test apparatus 301 is a frequency division multiplexing coherent OTDR including
a light incidence unit configured to change an optical frequency of light from a light source by a predetermined frequency interval at a predetermined time interval to generate test light pulses and cause the test light pulses to sequentially enter a fiber under test,
a light reception unit configured to use the light from the light source as local light to coherently detect backscattered light from the fiber under test to acquire a received signal, and
a computation unit configured to separate the received signal into signals with frequencies obtained by changing the optical frequency by the predetermined frequency interval, square amplitudes of the signals resulting from frequency separation to generate square values, perform Wiener filter processing on the square values, compensate values resulting from the Wiener filter processing for delay time when the test light pulses are caused to enter the fiber under test, and calculate an arithmetic mean of the compensated values.

Light Incidence Unit

Output light from a first light source 11 generating a light wave with a spectral line width Av is branched into two light rays by a multiplexer/demultiplexer 12, one of the light rays resulting from branching is used as local light, and the other is used as test light, which is caused to enter an optical frequency controller 13. Here, specifically, the multiplexer/demultiplexer 12 includes an optical coupler or the like.

The test light incident on the optical frequency controller 13 is frequency-shifted by a predetermined frequency fk' (k=1, 2, ..., N, N is a frequency multiplexing number) at predetermined time intervals T by the optical frequency controller 13. In the present example, T=10 μs, N=40, and fk'=108.4+(k−1)×0.8 MHz. Here, the optical frequency controller 13 uses a carrier suppression light single sideband modulator (SSB-SC modulator) that can suppress a carrier wave or a high-order modulation sideband and output, by bias voltage adjustment, only the plus or minus first-order modulation sideband. In the present example, bias adjustment is performed to allow the plus first-order modulation sideband to be output.

The test light subjected to frequency control as described above is input to the optical-pulse conversion processor 16 and converted into optical pulses at timings and at a pulse width controlled by a pulse generator 28. In the present example, the time waveform of the optical pulse is a rectangular wave. Specifically, the optical-pulse conversion processor 16 is an acoustic optical switch that pulses an acoustic optical modulator. Here, the output light from the acoustic optical switch is subjected to a fixed frequency shift (hereinafter referred to as $f_{AOM}$) preset during manufacture of the acoustic optical switch, and thus the test light pulse at each frequency has a frequency shift amount $|f_k \boxplus f_{AOM}|=f_k$ with respect to the local light. In the present example, $f_{AOM}=-100$ [MHz], and thus $f_k=8.4+k\times0.8$ [MHz].

Note that the optical frequency controller 13 and the optical-pulse conversion processor 16 are each driven by a sine wave generator 14 and a pulse generator 28 that are synchronized by a signal timing controller 17 and that timings are adjusted such that only the test light corresponding to the time of frequency control by the optical frequency controller 13 is converted into optical pulses, which are then output.

A second light source 31 is a light source having a wavelength different from the wavelength of the first light source 11. For example, in a case where the FUT is an optical fiber in a submarine optical amplification relay transmission system, light from the second light source 31 is superimposed on the test light pulses as dummy light to suppress a fluctuation in intensity of the entire test light to adjust the intensity to substantially the same level as that of the signal light intensity for communication, allowing the effect of optical surge to be suppressed. The dummy light from the second light source 31, having an extinction ratio increased by two optical-pulse conversion processors (16 and 36), is superimposed on the test light pulses.

The test light pulses and dummy pulses output by the optical-pulse conversion processor 16 are amplified by an optical amplifier 15 and subsequently pass through a circulator 17 and enter the FUT.

Light Reception Unit

Backscattered light generated in the FUT by the test light pulses passes through the circulator 17 and is subsequently multiplexed, by the multiplexer/demultiplexer 19, with the local light with a polarization state changed for each measurement by a polarization controller 29 in order to suppress a fluctuation in coherent detection efficiency caused by polarization. The resultant light is received by a balanced optical receiver 20. A band pass filter 23 cuts off an unnecessary high frequency component of a beat signal of the backscattered light and the local light output from the balanced optical receiver 20, and the resultant signal is sampled by the digitization processor 24.

Computation Unit

The beat signal of the frequency components resulting from sampling is subjected to frequency separation by a numeric computation processor 25, and all the resultant signals are added together for additional averaging processing. Finally, a series of steps of measurement and computation processing is repeated, the result is subjected to additional averaging processing, a numeric string resulting from the processing is logarithmically indicated, and an OTDR waveform can be finally obtained.

Figure 2:
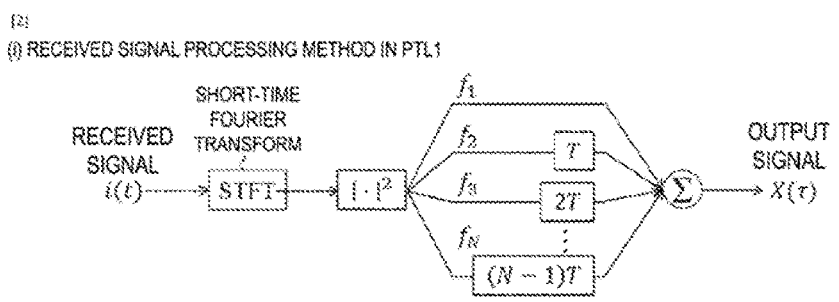
FIG. 2 is a diagram illustrating a signal processing method executed by the frequency division multiplexing coherent OTDR according to the present disclosure.
Figure 2:
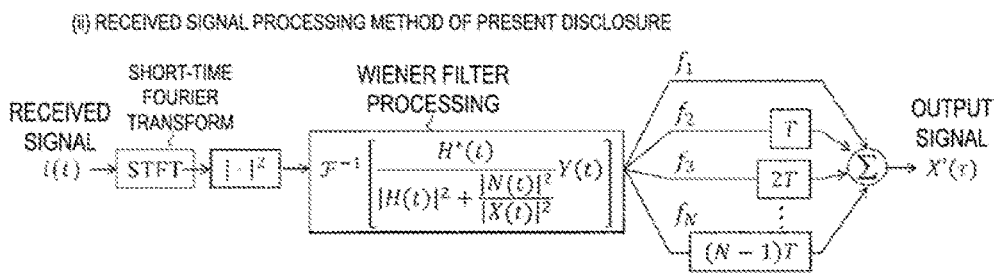

FIG. 2(*i*) is a diagram illustrating a method of frequency separation computation processing on sampled signals performed by the numeric computation processor 25 in PTL1 in order to obtain an OTDR waveform. Here, a description is provided assuming that a plane of polarization of the reflected light always aligns with a plane of polarization of the local light. First, a received signal i(t) of Fresnel reflected light reflected at any position $\tau_r$ is described as follows.

[Math. 1]

$$i(t) \propto \sum_{k}^{N} w_p(t-\tau_r)\cos[2\pi f_k(t-(k-1)T-\tau_r)+\Delta\theta(t,\tau_r)] \quad (1)$$

[Math. 2]

$$\Delta\theta(t,\tau_r) \equiv \theta(t-\tau_r)-\theta(t) \quad (2)$$

Here, $w_p(t)$ represents the intensity of incident test pulses at time t, and $\theta(t)$ represents phase noise at time t. Expression (1) corresponds to Expression (18) in PTL1.

To perform frequency separation processing on the received signal i(t), the following short-time Fourier transform is performed.

[Math. 3]

$$I_w(f,\tau) = \int_{-\infty}^{\infty} w_r(t-\tau)i(t)\exp[-j2\pi ft]dt \quad (3)$$

Here, $w_r$ represents a window function. Equation (3) indicates that Fourier transform is performed on a signal $w_r(t-\tau)i(t)$ obtained by multiplying the window function $w_r$ by a signal i(t) with moving by $\tau$ on the time axis. Equation (3) corresponds to Equation (19) in PTL1.

By performing the computation processing described above, the amplitude $I_w(f_k,\tau)$ of the reflected light generated by the test light pulses with a center frequency $f_k$ subjected to the frequency separation processing can be obtained from the received signal i(t).

The amplitude $I_w(f_k,\tau)$ of the reflected light subjected to frequency separation is raised to the second power, and a delay time (k−1)T at the time of pulse incidence is temporally shifted for each signal with a different frequency, and frequency signals of N waves are performed the arithmetic mean calculation. That is, a Fresnel reflection waveform in the FDM-OTDR is obtained from Equation (3-1).

[Math. 3-1]

$$X(\tau) = \frac{1}{N}\sum_{k=1}^{N} \overline{|I_w(f_k,\tau+(k-1)T)|^2} \quad (3\text{-}1)$$

The method described above corresponds to the signal processing method for the normal frequency separation illustrated in FIG. 2(*i*).

For the OTDR waveform, the waveform is indicated by using the same signal processing method. With effects of fading noise and polarization neglected, the OTDR waveforms can be simulated from a one-dimensional impulse response described below.

[Math. 3-2]

$$Y(\tau) = h_g(\tau) \odot X(\tau) \quad (3\text{-}2)$$

Here, $h_R(\tau)=\gamma \exp(-\alpha v_g\tau)$, $\gamma$ is a reflection coefficient for a scatterer, $\alpha$ is a loss in the optical fiber, $v_g$ is the group velocity of the optical fiber, and $\otimes$ denotes convolution.

Frequency separation signal processing will be described below that is executed in a case where the laser line width of the light source 11 is not sufficiently smaller than the signal band. First, Equation (3) can be modified into Equation (6).

[Math. 6]

$$\int_{-\infty}^{\infty} w_r(t-\tau)i(t)\exp[-j2\pi ft]dt = \mathcal{F}[w_r(t-\tau)i(t)] \quad (6)$$
$$= W_r(f-\omega) \otimes I(f)$$
$$= \int_{-\infty}^{\infty} W_r(f-\omega-f')I(f')df'$$

Here, F[■] indicates Fourier transform, and $W_r(f)$ and $I(f)$ respectively represent as follows.

[Math. 7]

$$W_r(f-\omega) = \mathcal{F}[w_r(t-\tau)] \quad (7)$$

and

[Math. 8]

$$I(f) = \mathcal{F}[i(t)] \quad (8)$$

Here, a power spectrum $S_d(f)=|I(f)|^2$ of a received signal can be represented by using a power spectrum $S_p(f)$ of test light pulses and a frequency spectrum $S_L(f)$ of a laser light source, as in the convolutional operation below.

[Math. 9]
$$S_d(f)=S_p(f)\otimes S_L(f) \quad (9)$$

Here, $S_p(f)$ is uniquely determined only by the pulse shape, and is independent of the phase noise property of the laser light source. Assuming that the FM noise spectrum of the laser light source is white noise, the frequency spectrum $S_L(f)$ of the laser light source can be described in the following Lorentzian function.

[Math. 10]
$$S_L(f) = \frac{\Delta v}{2\pi\left[f^2 + \left(\frac{\Delta v}{2}\right)^2\right]} \quad (10)$$

Here, $\Delta v$ denotes the spectral line width of the light source 11.

Thus, a power spectrogram of the received signal determined by the short-time Fourier transform in Equation (3) can be described in Equation (13).

[Math. 13]
$$\begin{aligned}|I_w(f,\tau)|^2 &= |W_r(f)\otimes I(f)|^2 \\ &= |W_r(f)|^2 \otimes |I(f)|^2 \\ &= S_r(f-\omega)\otimes S_p(f)\otimes S_L(f)\end{aligned} \quad (13)$$

Here, $S_r(f-\omega)=|W_r(f-\omega)|^2$.

In Equation (13), $S_L(f)$ represents the effect of the line width of the laser source. In other words, by solving Equation (13) to determine

[Math. 13-1]
$$S_r(f-\omega)\otimes S_p(f) \quad (13\text{-}1)$$

the effect of the line width of the laser light source in the OTDR waveform can be compensated for.

A manner of solving Equation (13) will be described below. Writing:

[Math. 13-2]
$$|I_w(f,\tau)|^2=y(f)$$
$$S_r(f-\omega)\otimes S_p(f)=x(f)$$
$$S_L(f)=h(f) \quad (13\text{-}2)$$

for simplicity provides the equation below.

[Math. 14]
$$y(f)=h(f)\otimes x(f) \quad (14),$$

and performing Fourier transform on both sides of the equation leads to:

[Math. 15]
$$Y(t)=H(t)X(t). \quad (15)$$

Here, Y(t), H(t), and X(t) respectively indicate $Y(t)=F[y(f)]$, $H(t)=F[h(f)]$, and $X(t)=F[x(f)]$. Modifying Equation (15) and performing inverse Fourier transform on the resultant equation leads to:

[Math. 16]
$$x(f) = \mathcal{F}^{-1}\left[\frac{Y(t)}{H(t)}\right], \quad (16)$$

and
Equation (16) is the solution of Equation (13).

The solution is exactly correct under the condition that no noise is added to the received signal $|I_w(f,\tau)|^2$, and in contrast to a linear response represented in Equation (13), $Y(t)/H(t)$ is referred to as an inverse filter. In a case where noise $n(f)$ is added to $|I_w(f,\tau)|^2$, the equation can be solved by using a Wiener filter in Equation (17).

[Math. 17]
$$x(f) = \mathcal{F}^{-1}\left[\frac{H^*(t)}{|H(t)|^2 + \frac{|N(t)|^2}{|X(t)|^2}}Y(t)\right] \quad (17)$$

Here, * denotes a complex conjugate and is defined as $N(t)=F[n(f)]$. Typically,

[Math. 18]
$$\frac{|N(t)|^2}{|X(t)|^2} \quad (18)$$

is an unknown function and is replaced with a constant $\Gamma$.

As described above, using the Wiener filter represented in Equation (17) enables compensation for the effect of the spectral line width of the laser light source included in the received signal $|I_w(f,\tau)|^2$ indicated in Equation (3).

Specifically, as illustrated in FIG. 2(ii), in contrast to the processing by the numeric computation processor 25 of the optical pulse test apparatus in FIG. 2(i), the numeric computation processor 25 of the optical pulse test apparatus 301 of the present embodiment raises, to the second power, the amplitude $I_w(f_k,\tau)$ of the reflected light subjected to frequency separation, then executes Wiener filter processing, and subsequently executes additional averaging processing on frequency signals of N waves.

The Wiener filter processing corresponds to Equation (17) and is processing of performing inverse Fourier transform $(F^{-1}[\blacksquare])$ on a value obtained by multiplying a square value (Y(t)) of the square values resulting from Fourier transform by a value obtained by dividing the complex conjugate (H*(t)) of the frequency spectrum of the light source resulting from Fourier transform by a value obtained by adding any value (constant $\Gamma$) to the second power ($|H(t)|^2$) of the frequency spectrum of the light source resulting from Fourier transform.

EXAMPLES

Figure 3:
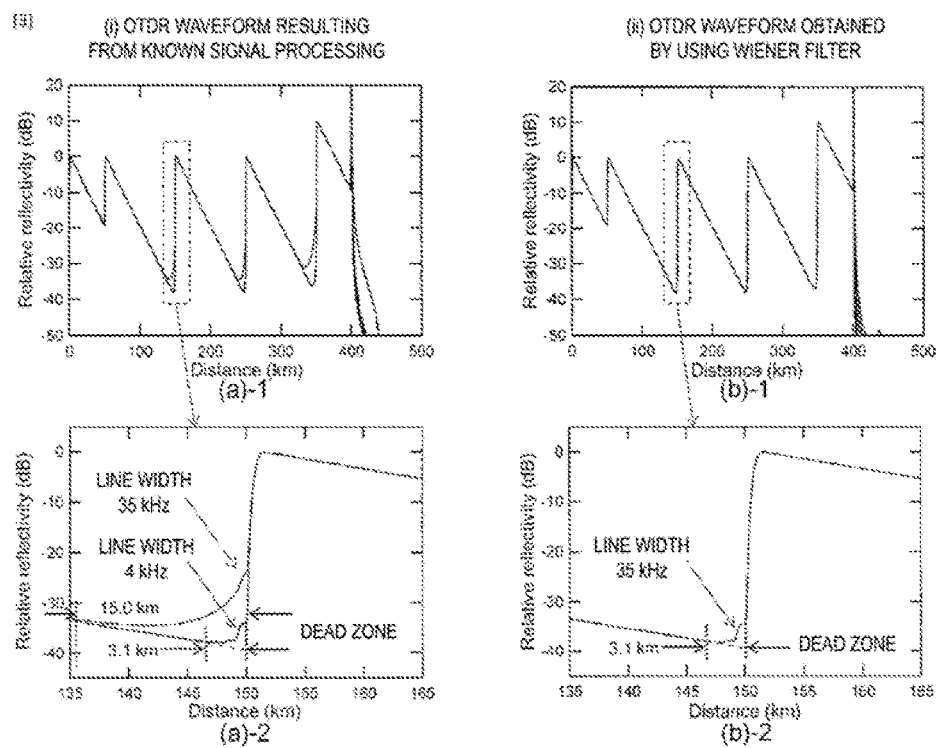
FIG. 3 is a diagram illustrating the effect of the frequency division multiplexing coherent OTDR according to the present disclosure.
Figure 4:
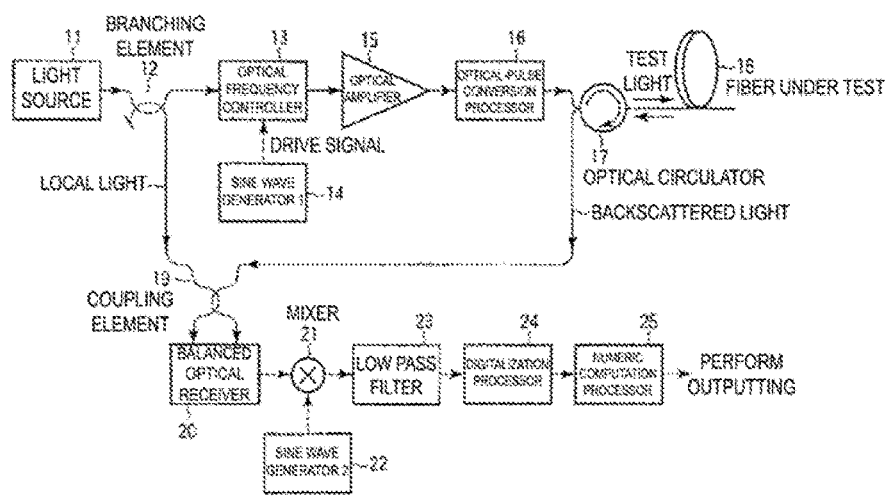
FIG. 4 is a diagram illustrating a configuration of a frequency division multiplexing coherent OTDR described in PTL1.
Figure 5:
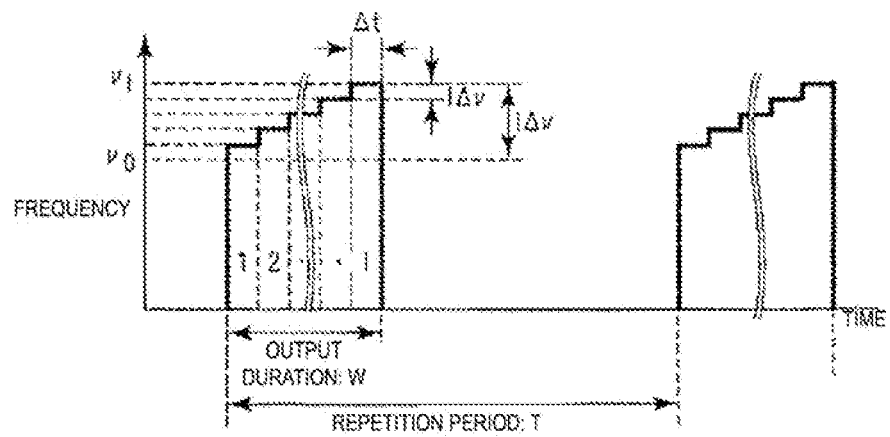
FIG. 5 is a diagram illustrating test light in a frequency division multiplexing coherent OTDR.
Figure 6:
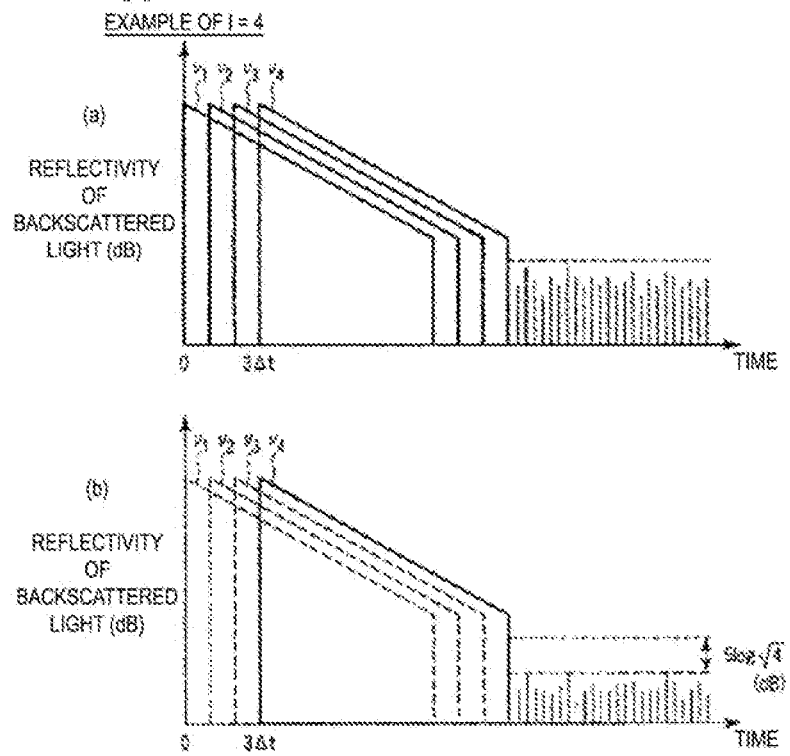
FIG. 6 is a diagram illustrating the effect of the frequency division multiplexing coherent OTDR.

FIG. 3 illustrates the results of simulation of an OTDR waveform using the (i) signal processing method in PTL1 and the (ii) optical pulse test apparatus 301 for an optical amplification relay line with an overall length of 400 km. FIGS. 3(a)-1 and 3(b)-1 are OTDR waveforms for the entire optical amplification relay line, and FIGS. 3(a)-2 and 3(b)-2 are enlarged views of vicinity of the point of a fluctuation in reflectance at an amplifier gain of 40 dB and at a distance of 150 km.

In the signal processing method in PTL1, in a case where the laser line width is 4 kHz and is sufficiently smaller than the signal band (B=1/T) of 100 kHz, the dead zone is 3.1 km, whereas in a case where the laser line width of 35 kHz is not sufficiently smaller than the signal bandwidth (B=1/T) of 100 kHz, the dead zone is larger and is 15.0 km.

On the other hand, the use of the optical pulse test apparatus 301 reduces the dead zone to 3.1 km even with a laser line width of 35 kHz, and this result is the same as the result for a laser line width of 4 kHz. Thus, the use of the Wiener filter in the numeric computation processor 25 allows compensation for spreading of the dead zone due to the laser line width of the light source 11.

Effects of the Invention

According to the present disclosure, the use of the Wiener filter in the signal processing following reception can provide a frequency division multiplexing coherent OTDR using an inexpensive DFB laser used for normal optical communication without using an expensive, sandwiched width laser light source with a small spectral line width.

REFERENCE SIGNS LIST

11 First light source
12 Multiplexer/demultiplexer
13 Optical frequency controller
14 Sine wave generator
15 Optical amplifier
16 Optical-pulse conversion processor
17 Circulator
19 Multiplexer/demultiplexer
20 Balanced optical receiver
21 Mixer
22 Sine wave generator
23 Band pass filter
24 Digitization processor
25 Numeric computation processor
27 Signal timing controller
28 Pulse generator
29 Polarization controller
31 Second light source
32 Multiplexer/demultiplexer
36 Optical-pulse conversion processor

The invention claimed is:

1. A frequency division multiplexing coherent Optical Time Domain Reflectometer (OTDR) comprising:
a light incidence unit configured to change an optical frequency of light from a light source by a predetermined frequency interval at a predetermined time interval to generate test light pulses and cause the test light pulses to sequentially enter a fiber under test;
a light reception unit configured to use the light from the light source as local light to coherently detect backscattered light from the fiber under test to acquire a received signal; and
a computation unit configured to separate the received signal into signals with frequencies obtained by changing the optical frequency by the predetermined frequency interval, square amplitudes of the signals resulting from frequency separation to generate square values, perform Wiener filter processing on the square values, compensate values resulting from the Wiener filter processing for delay time when the test light pulses are caused to enter the fiber under test, and calculate an arithmetic mean of the compensated values.

2. The frequency division multiplexing coherent OTDR according to claim 1, wherein
the Wiener filter processing is processing of performing inverse Fourier transform on a value obtained by multiplying a square value of the square values resulting from Fourier transform by a value obtained by dividing a complex conjugate of a frequency spectrum of the light source resulting from Fourier transform by a value obtained by adding any value to a second power of the frequency spectrum of the light source resulting from Fourier transform.

3. The frequency division multiplexing coherent OTDR according to claim 1, wherein
the light incidence unit superimposes, on each of the test light pulses, dummy light having a wavelength different from a wavelength of the light from the light source.

4. A test method executed by a frequency division multiplexing coherent OTDR, the test method comprising:
changing an optical frequency of light from a light source by a predetermined frequency interval at a predetermined time interval to generate test light pulses and causing the test light pulses to sequentially enter a fiber under test;
using the light from the light source as local light to coherently detect backscattered light from the fiber under test to acquire a received signal; and
separating the received signal into signals with frequencies obtained by changing the optical frequency by the predetermined frequency interval, squaring amplitudes of the signals resulting from frequency separation to generate square values, performing Wiener filter processing on the square values, compensating values resulting from the Wiener filter processing for delay time when the test light pulses are caused to enter the fiber under test, and calculating an arithmetic mean of the compensated values.

5. The test method according to claim 4, wherein
the Wiener filter processing is processing of performing inverse Fourier transform on a value obtained by multiplying a square value of the square values resulting from Fourier transform by a value obtained by dividing a complex conjugate of a frequency spectrum of the light source resulting from Fourier transform by a value obtained by adding any value to a second power of the frequency spectrum of the light source resulting from Fourier transform.

6. A frequency division multiplexing coherent OTDR comprising:
a light incidence unit configured to change an optical frequency of light from a light source by a predetermined frequency interval at a predetermined time interval to generate test light pulses and cause the test light pulses to sequentially enter a fiber under test,
a light reception unit configured to use the light from the light source as local light to coherently detect backscattered light from the fiber under test to acquire a received signal,
a computer processor; and a recording medium having a computer program recorded thereon, when executed by the computer processor, performs:
separating the received signal into signals with frequencies obtained by changing the optical frequency by the predetermined frequency interval, squaring amplitudes of the signals resulting from frequency separation to generate square values, performing Wiener filter processing on the square values, compensating values resulting from the Wiener filter processing for delay time when the test light pulses are caused to enter the fiber under test, and calculating an arithmetic mean of the compensated values.

7. The frequency division multiplexing coherent OTDR according to claim 6, wherein
the Wiener filter processing is processing of performing inverse Fourier transform on a value obtained by multiplying a square value of the square values resulting from Fourier transform by a value obtained by dividing a complex conjugate of a frequency spectrum of the light source resulting from Fourier transform by a value obtained by adding any value to a second power of the frequency spectrum of the light source resulting from Fourier transform.

* * * * *